United States Patent [19]

Plocik

[11] 4,238,064
[45] Dec. 9, 1980

[54] SYSTEM FOR ACTUATING GLASS RIBBON, CROSS SCORING AND SNAPPING EQUIPMENT

[75] Inventor: Daniel C. Plocik, Burkburnett, Tex.

[73] Assignee: PPG Industries, Inc., Pittsburgh, Pa.

[21] Appl. No.: 927,083

[22] Filed: Jul. 24, 1978

[51] Int. Cl.³ ............................................. C03B 33/02
[52] U.S. Cl. ................................ 225/2; 83/13; 83/71; 83/74; 225/4; 225/96.5; 225/98; 226/11; 340/675
[58] Field of Search ................ 83/71, 13, 369, 74; 225/2, 4, 96.5; 340/675; 226/11

[56] References Cited

U.S. PATENT DOCUMENTS

| | | | |
|---|---|---|---|
| 3,191,857 | 6/1965 | Galey et al. | 234/3 |
| 3,215,015 | 11/1965 | Neely, Jr. | 83/363 |
| 3,216,809 | 11/1965 | Slabodsky | 83/7 |
| 3,276,647 | 10/1966 | Lewis, Jr. et al. | 83/74 X |
| 3,282,140 | 11/1966 | Sasabuchi et al. | 83/7 |
| 3,406,601 | 10/1968 | Clifford | 83/72 |
| 3,419,374 | 12/1968 | Offenbacher et al. | 65/160 |
| 3,429,491 | 2/1969 | Windley | 226/11 |
| 3,539,324 | 11/1970 | Terakado et al. | 65/158 |
| 3,556,368 | 1/1971 | Rene | 226/11 |
| 3,581,615 | 6/1971 | Kaneshige et al. | 83/295 |
| 3,628,450 | 12/1971 | Schmidt | 83/38 |
| 3,732,761 | 5/1973 | Sanders | 83/37 |
| 3,802,306 | 4/1974 | Brown et al. | 83/12 |
| 3,917,142 | 11/1975 | Guarderas | 340/675 X |
| 3,949,856 | 4/1976 | Ulber et al. | 340/675 X |
| 4,020,722 | 5/1977 | Byrt et al. | 83/74 |
| 4,044,639 | 8/1977 | Kato | 83/7 |

Primary Examiner—Frank T. Yost
Attorney, Agent, or Firm—Donald Carl Lepiane

[57] ABSTRACT

Pulses from a motor-driven roto pulser, e.g., primary pulses, and from a roto pulser powered by a moving ribbon, e.g., secondary pulses, are (1) compared to determine if the ribbon is continuous and (2) used to actuate ribbon cross scoring and snapping equipment. When the secondary pulse count exceeds the primary pulse count for a given ribbon displacement by more than a predetermined amount, indications are that a ribbon break has occurred and the scoring and snapping equipment is actuated by the pulses from the ribbon powered roto pulser. When the difference between the secondary pulse count and primary pulse count is less than the predetermined amount, indications are that the ribbon is continuous and the equipment is actuated by pulses from the motor-driven roto pulser.

19 Claims, 3 Drawing Figures

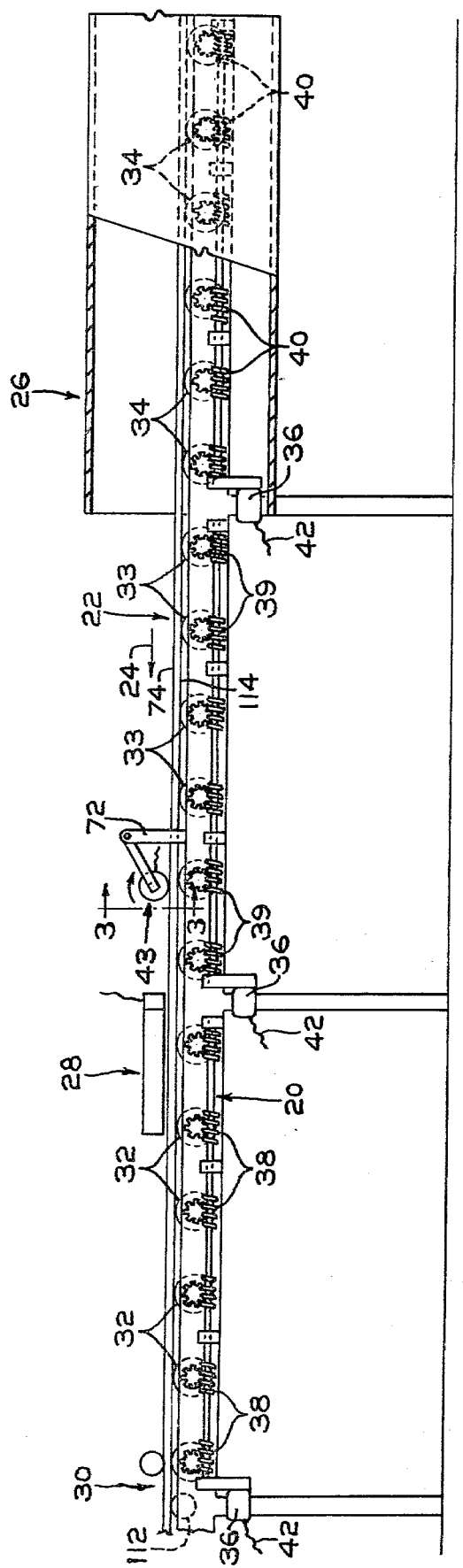
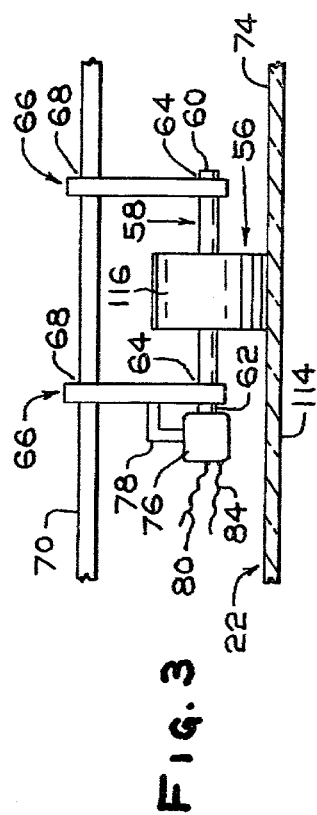
Fig. 1
Fig. 3

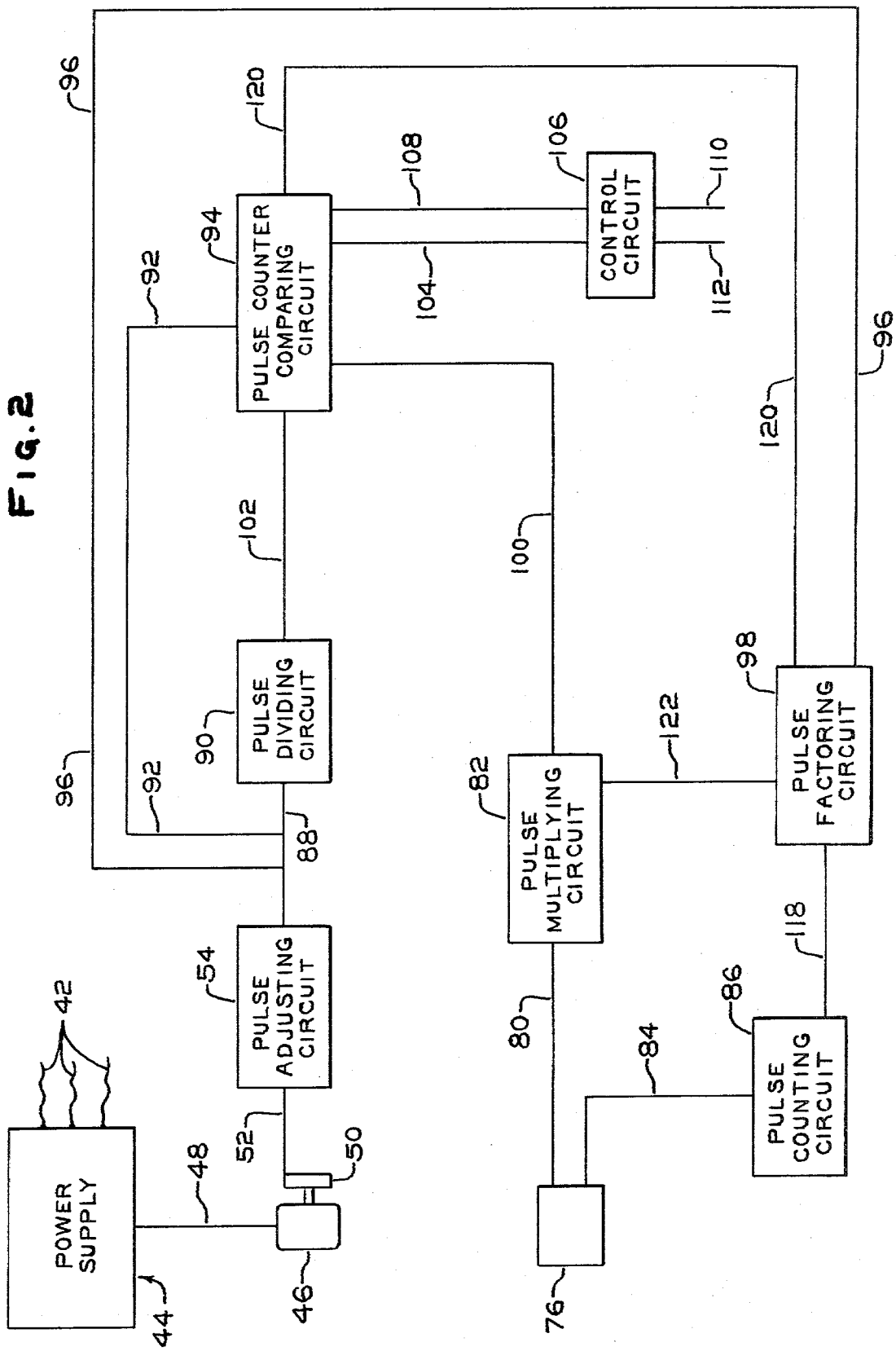

SYSTEM FOR ACTUATING GLASS RIBBON, CROSS SCORING AND SNAPPING EQUIPMENT

BACKGROUND OF THE INVENTION

1. Field of the Invention:

This invention relates to a system for monitoring the movement of a ribbon e.g. a glass ribbon, to actuate ribbon severing equipment and to a system for determining the continuity of the ribbon.

2. Discussion of the Prior Art and Technical Problems:

In the glassmaking industry, continuous glass ribbons are inspected and subsequently cut into usable glass sheets. U.S. Pat. Nos. 3,191,857 and 3,216,809 teach various methods that are used for inspecting glass ribbons for subsequently cutting the glass ribbon into sheets of a predetermined width.

U.S. Pat. Nos. 3,282,140; 3,419,374; 3,539,324; 3,581,615 and 3,802,306 different apparatuses that may be used for monitoring the movement of the ribbon and actuating severing equipment to cut a ribbon into sheets. In general, the patents teach the use of a wheel in contact with the glass ribbon to monitor ribbon displacement. The wheel may be connected to pulse generating equipment to generate pulses as a function of ribbon displacement which pulses are subsequently converted into units of length. One of the drawbacks of using a ribbon-driven wheel for generating pulses is that changes in the wheel diameter as a result of operation variables, e.g., particle pick up, or wheel wear can increase or decrease the wheel diameter which results in randomly increasing or decreasing pulse counts for a given ribbon displacement.

The use of displacement detectors, e.g., roto pulsers, is not limited to the glass industry. For example, U.S. Pat. Nos. 3,215,015; 3,406,601; 3,429,491; 3,556,368; 3,628,450; 3,732,762; and 4,044,639 teach, among other things, the use of ribbon-driven wheels in the steel, paper and plastic industries for measuring ribbon displacement and/or for determining ribbon breaks. The drawbacks of using a ribbon driven wheel was discussed supra regarding their use in measuring glass ribbons.

U.S. Pat. No. 3,949,856 teaches a system for monitoring paper feed in printing mechanisms in which signals from two systems each actuated by wheels driven by a paper ribbon are compared to determine ribbon continuity. The drawback of the system taught in U.S. Pat. No. 3,949,856 is that both signals are generated by the movement of the paper ribbon. For example, one of the signals is generated by the paper frictionally driving a wheel and the other signal is generated by a wheel having gear teeth engaging holes in the edges of the paper ribbon. With the wheel arrangement taught in the U.S. Pat. No. 3,949,856, wheel(s) wear, dirt pickup, or variations in engaging holes at the marginal edge of the ribbon can randomly vary the difference in pulse counts between the wheels which may result in erroneous conclusions.

It would be advantageous, therefore, to provide a system for (1) monitoring the movement of a substrate, e.g., a glass ribbon, to actuate equipment, e.g., glass scoring and snapping equipment and (2) for determining the continuity of the ribbon, that does not have the limitations and/or drawbacks of the prior art.

SUMMARY OF THE INVENTION

This invention relates to a method of and an apparatus for determining the continuity of a ribbon advancing along a movement path on a conveyor. A first signal as a function of advancement of the conveyor e.g. primary pulse counts and a second signal e.g., secondary pulse counts generated by the advancing ribbon are subtracted from one another to determine ribbon continuity for a given ribbon displacement or time period. For example, if the second signal exceeds the first signal by a predetermined amount the ribbon has a break and if the difference between the second signal and the first signal is less than the predetermined amount the ribbon is continuous.

The invention also relates to a method of and apparatus for monitoring the movement of a substrate e.g. a glass ribbon as it advances along a movement path having work positions e.g. a position for scoring the ribbon and/or a position for snapping the ribbon at a score line. A first signal e.g. primary pulse counts generated as a function of advancement by signal e.g. primary pulse counts generated as a function of advancement by the ribbon and a second signal e.g. secondary pulse counts, generated by the advancement of the ribbon are subtracted from one another. If the secondary pulse count exceeds the primary pulse count by a predetermined amount, the secondary pulse counts are used to monitor ribbon displacement e.g. to actuate the scoring and/or snapping of the ribbon. If the difference between the secondary pulse count and the primary pulse count is less than the predetermined amount the primary pulse counts are used to monitor ribbon displacement e.g. to actuate the scoring and/or snapping equipment.

BRIEF DESCRIPTION OF THE DRAWING

FIG. 1 is a side elevated view partially in cross section for purposes of clarity of conveying system for advancing a glass ribbon from an annealing lehr through scoring and snapping stations to sever the glass ribbon into glass sheets in accordance to the teachings of the invention.

FIG. 2 is an electric circuit in block form that may be used in the practice of the invention; and FIG. 3 is a view taken along lines 3—3 of FIG. 1.

DESCRIPTION OF THE INVENTION

Shown in FIG. 1 is a conveyor 20 for advancing a glass ribbon 22 in the direction of arrow 24 through an annealing lehr 26 and work positions e.g. scoring station 28 and snapping station 30. The conveyor 20 is of the type used in the conveying art and includes a plurality of group of rotatably mounted rolls 32–34 each conventionally driven by a motor 36 through a gear arrangement 38–40, respectively. The conveyor 20, the annealing lehr 26, the scoring station 28 and the snapping station 30 are not limiting to the invention and are presented to illustrate one environment in which the invention may be practiced. For example, the scoring and snapping stations taught in U.S. Pat. No. 4,072,259 which teachings are hereby incorporated by reference may be used in the practice of the invention.

With reference to FIGS. 1 and 2, each of the motors 36 are connected by way of line 42 to a power supply 44. As clearly shown in FIG. 2, the power supply 44 also drives motor 46 through line 48 with the motor 46 driving a signal generator e.g. a roto pulser 50. The pulses from the roto pulser 50, hereinafter referred to as primary pulses, are forwarded by way of line 52 to a pulse adjusting circuit 54. The adjusting circuit 54 is not limiting to the invention but is recommended to make adjustments to the primary pulse count to compensate for roll wear and roll replacement. In this regard, peripheral changes in the rolls 32-34 change the effective speed of the ribbon 22. Therefore, by comparing actual ribbon displacement to primary pulse counts for the ribbon displacement on a periodic schedule and making the required pulse count adjustments, a predetermined number of primary pulse counts from the pulse adjusting circuit can be equated to glass ribbon displacement in units of length, e.g., inches or centimeters.

Referring now to FIGS. 1 and 3, mounted above the glass ribbon 22 between the scoring station 28 and the annealing lehr 26 i.e., upstream of the scoring station 28, is a wheel 56 securely mounted on shaft 58 having its ends 60 and 62 rotatably mounted at 64 in arms 66. The arms 66 are rotatably mounted at 68 on rod 70 mounted above the glass ribbon by posts 72 (one only shown in FIG. 1). With the arrangement, gravity urges the wheel 56 into engagement with upper surface 74 of the glass ribbon 22. A signal generator or roto pulser 76 is operatively connected to the shaft 58, e.g., to shaft end 62, and held in position by member 78 mounted to the roto pulser 76 and arm 66 as shown in FIG. 3. As the glass ribbon 22 advances along the conveyor 20, the wheel 56 is frictionally driven by the ribbon 22 which in turn rotates the roto pulser 76 to forward a signal or pulses hereinafter referred to as secondary pulses, along line 80 to a pulse multiplying circuit 82 and along line 84 to pulse counting circuit 86 each to be discussed in more detail below.

With specific reference to FIG. 2, the primary pulses from the pulse adjusting circuit 54 are forwarded along line 88 to a pulse dividing circuit 90; along line 92 to a pulse counter comparing circuit 94; and along line 96 to a pulse factoring circuit 98. The secondary pulses received in the pulse multiplying circuit 82 are multiplied by a predetermined factor such that the count of adjusted secondary pulses from the multiplying circuit 82 is equal to the count of primary pulses from the pulse adjusting circuit 54 for a given ribbon displacement for reasons to be discussed below. The adjusted secondary pulses are forwarded along line 100 to the pulse counter comparing circuit 94. The pulse counter comparing circuit 94 continually receives primary pulses or primary frequencies from the line 92 and secondary pulses or secondary frequencies from the line 100 and continually subtracts the pulses or frequencies. Upon receiving a signal along line 102 from the dividing circuit 90, the accumulated difference is shifted to a comparing section in the circuit 94 in order that subsequent incoming pulses from the lines 92 and 100 can be compared. The accumulated difference is compared to a predetermined number of determine if the ribbon is continuous. If the accumulated difference is greater than the predetermined number, a ribbon break has occurred and the secondary pulses are forwarded through the circuit 94 along line 104 to control circuit 106. If the difference is less than the predetermined number, the ribbon is continuous and the primary pulses are forwarded through the circuit 94 along line 108 to the control circuit 106. The control circuit 106 is not limited to the invention and may be as of the types used in the art to forward a signal along line 110 to actuate scoring equipment at the scoring station 28 and along line 112 to actuate snapping equipment at the snapping station 30 to sever sections of predetermined size from the glass ribbon 22.

The signal from the pulse dividing circuit 90 is forwarded for a given ribbon displacement as indicated by the primary pulses. For example, the circuit 90 is set with a pulse count corresponding to a desired ribbon length to check the ribbon continuity each time the pulse count is counted. When the count is reached by the circuit 90, a signal is forward along the line 102 to the circuit 94 as previously discussed, the dividing circuit 90 is set to zero and counts incoming pulses received from the line 88.

The manner in which a ribbon break is determined using the primary pulses and the secondary pulses will now be discussed. With reference to FIGS. 1 and 3, the rolls 32-34 of the conveyor 20 frictionally engage underside 114 of the ribbon 22 to urge it in the direction of the arrow 22. For a continuous glass ribbon, the forward ribbon advance is a function of the conveyor roll speed. However, the speed of the ribbon is slightly less than the peripheral rotation of the rolls due to ribbon drag. Therefore, the primary pulses are adjusted by the circuit 54 (see FIG. 2) so that pulse counts in a given time period correspond to a given ribbon displacement or vice versa. As the glass ribbon advances under the wheel 56, the roto pulse 76 generates secondary pulses as previously discussed. For a continuous ribbon, the secondary pulses for a given ribbon displacement remain constant except for wheel periphery changes discussed above and in more detail below. However, if the ribbon breaks, e.g., upstream of the wheel 56, the speed of the ribbon increases because there is reduced or no ribbon drag and the ribbon accelerates increasing the rotational speed of the wheel 56. Although the number of secondary pulses increases for a given time period, they are representative of a given ribbon length. The accumulated pulse difference between the secondary pulses and the unchanging primary pulses as determined in the circuit 94 in the same time period and/or for a given ribbon displacement according to the primary pulse count set in the pulse dividing circuit 90 are used to indicate a ribbon break. For example, if the accumulated difference is greater than a predetermined pulse count, the conclusion is that the secondary pulse count has exceeded the primary pulse count because there is reduced or no ribbon drag i.e. a ribbon break.

As the surface of the wheel 56 moves along ribbon surface 74, it may pick up dirt; chalk from chalk marks indicating defects in the glass ribbon 22 and/or the wheel surface 116 may wear from contacting glass ribbon. The above situations can cause a decrease and/or increase in the periphery of the wheel diameter which may result in pulse count variations for a given time period or ribbon displacement. To compensate for such conditions, additional circuitry now to be discussed may be used. Referring to FIG. 2, the pulse counting circuit 86 counts the secondary pulses from the roto pulser 76 and when a predetermined count is reached, (1) a pulse is forwarded to the pulse factoring ciruict 98 by line 118; (2) the counting circuit is reset and (3) the counting circuit 86 is restarted. When the circuit 98 receives the signal from the circuit 86, the accumulated primary pulses received in the circuit 98 along the line 96 are compared to determine their ratio e.g., the primary pulse count is divided by the secondary pulse count. If the recently determined ratio is the same as the previously determined ratio no action is taken. If the recently determined ratio is different than the previously determined ratio and a ribbon break has occurred as indicated by a signal along line 120 from the comparing circuit 94, no action is taken. If the recently determined ratio is different than the previously determined ratio and the ribbon is continuous, a signal is sent along line 122 to the multiplying circuit 82 to set a new multiplying factor therein based on the recently determined ratio and the previously determined factor erased. In this manner, the primary pulses and the secondary pulses forwarded to the comparing circuit 94 by way of lines 92 and 100, respectively, correspond to the same ribbon displacement and/or time period for a continous ribbon.

As can now be appreciated, the invention is not limited to the circuitry used, and any of the types used in the art may be employed in the practice of the invention. Further, the practice of the invention is not limited to a glass ribbon but may be used with paper, plastic or metal ribbons as well as glass, paper, plastic or metal subtrates.

DETAILED DESCRIPTION OF THE INVENTION

Referring to FIG. 1, the invention is practiced to sever 72 inch (1.8 meter) glass pieces from a 160 inch (4.5 meter) wide glass ribbon 22. The glass ribbon 22 is advanced along movement path 24 by the conveyor 20. Rolls 32–34 of the conveyor are powered by synchronous motors 36 of the type sold by General Electric Corp. to advance the glass ribbon 22 at a linear speed of about 150 inches/minute (3.8 meters/minute). With reference to FIGS. 1 and 2, the synchronous motor 36 and synchronous motor 46 similar to the motors 36 are energized by power supply 44. The motor 46 rotates roto pulser 50 o the type sold by Dynopar Corp. to forward pulses along line 52 to pulse adjusting circuit 54. The circuit 54 is set such that for every 24 inches (0.6 meters) of ribbon travel, the number of pulses from the circuit 80 is about 7680, i.e., 320 pulses/inch (126 pulses/centimeter).

Referring now to FIG. 3, rubber wheel 56 having a diameter of about 3.82 inches (9.7 centimeters) and a thickness of about 0.25 inches (0.64 centimeters) is securely mounted on steel shaft 58 having a diameter of about 0.75 inches (1.92 centimeters) and a length of about 5 feet (1.5 meters). Ends 60 and 64 of the shaft 58 are mounted in bearings (not shown) in the arm 66 at 64. The arm 66 made of steel has a length of about 32 inches (81 centimeters), a width of about 3 inches (7.62 centimeters) and a thickness of about 0.25 inches (0.64 centimeters) and are rotatably mounted at 68 on rod 70 supported above the glass ribbon 22 by posts 72 (one only shown in FIG. 1). Mounted on end 62 of the shaft 58 is a roto pulser 76 of the type sold by Litton Ind. which generates 4000 pulses for one complete wheel revolution which is equal to about 12 inches (0.3 meters) of ribbon travel i.e. 333⅓ pulses/inch (131 pulse/centimeter). The roto pulser 76 is secured in position by a member 78 secured to the adjacent leg 66 and to the roto pulser 76. The pulses from the roto pulser 76 are forwarded by way of line 80 to a pulse multiplying circuit 82 which multiplies the pulses from the rotor pulser by a factor of 0.9600. In this manner, the count of secondary pulses from the circuit 82 sent along line 100 to circuit 94 for one inch of ribbon travel is 320 pulses (126 pulses/centimeter) which is equal to the nuber of pulses for one inch of ribbon travel from the adjusting circuit 54 forwarded along line 88 to pulse dividing circuit 90;

along line 96 to pulse factoring circuit 98 and along line 92 to pulse counter comparing circuit 94.

The pulses from lines 92 and 100 are continually received by the circuit 94 and subtracted. The pulse divider circuit 90 is set at a pulse count of 7860 to accumulated pulse difference in the circuit 94 between the primary pulses and secondary pulses for every 24 inches (0.6 meters) of ribbon travel to determine if a ribbon break has occurred. When the dividing circuit reaches a count of 7860 a signal is forwarded along line 102 to the comparing circuit 102 after which the dividing circuit 90 is set to zero and starts counting over again. Upon receiving the signal from the circuit 90, the accumulated difference is forwarded to a comparing section of the circuit 94 as the difference of incoming pulses from the lines 92 and 100 are continually accumulated. If the accumulated difference is less than 10 the ribbon is continuous and a signal is forwarded along line 120 to the factoring circuit 98 and the primary pulses pass through the circuit 94 along line 108 to the control circuit 106. When the control circuit reaches a full count of 23,040, signals are forwarded along lines 110 and 112 to the scoring station 28 and snapping station 30, respectively, to sever the ribbon into 72 inch (1.8 meter) sections. If the accumulated difference is greater than 10, a ribbon break has occurred and the secondary pulses from the line 100 pass through the circuit 94 and along line 104 to the control circuit 106 to sever the ribbon as previously discussed.

With continued reference to FIG. 2, the secondary pulse received by counting circuit 86 accumulate to a count of 1,000,000 at which time a signal is forwarded along the line 118 to the circuit 98 and the counting circuit 86 clears and starts to count secondary pulses received along the line 84. Upon receiving the signal from the circuit 86, the accumulated primary pulses in the circuit 98 received along the line 96 are divided by 1,000,000. If the ratio is 0.9600 no action is taken. If the ratio is other than 0.9600 and a ribbon break has occurred as indicated by a signal from the circuit 94 along the line 120, no action is take. If the ratio is other than 0.9600 and the ribbon is continuous as indicated by no signal from the circuit 94, the new ratio or factor e.g. the accumulated primary pulse count divided by 1,000,000 is forwarded along line 122 to the circuit 82. The previous factor of 0.9600 is erased and the new factor is used to act on incoming secondary pulses from the roto pulser 76.

The above is repeated as the ribbon 22 is advanced along the movement to determine ribbon continuity and to sever the ribbon into sheets.

As can be appreciated the above example is presented for illustration purposes only and is not limiting to the invention.

I claim:

1. A method of monitoring movement of a substrate advancing against substrate drag along a movement path comprising the steps of:
    frictionally engaging the substrate by conveying means to advance the substrate at a linear speed less than linear displacement speed of the conveying means;
    generating a first displacement signal as a function of linear displacement speed of the conveying means;
    contacting ribbon surface by generating means to generate a second displacement signal;
    determining differences between the first and second displacement signals;

employing the first displacement signal to monitor substrate advance when differences of said determining step have a first relationship to a predetermined standard; and employing the second displacement signal to monitor substrate advance when the difference of said determining step has a relationship other than the first relationship.

2. The method as set forth in claim 1 wherein the first displacement signal is primary pulses, the second displacement signal is secondary pulses and said determining step is accomplished by:

accumulating the different between the primary pulses and the secondary pulses for a given substrate displacement.

3. The method as set forth in claim 2 wherein said observing steps are accomplished by:

comparing the accumulated difference between the primary pulses and the secondary pulses;

using the primary pulses to monitor the substrate advance when the accumulated difference is less than a predetermined value; and using the secondary pulses to monitor the substrate advance when the accumulated difference is more than the predetermined value.

4. The method as set forth in claim 1 wherein the substrate is a ribbon.

5. The method as set forth in claim 1 wherein scoring means is positioned along the movement path and the substrate is a glass ribbon which is monitored to actuate the scoring means and further including:

said step of employing the first signal includes the step of actuating the scoring means in response to the first signal when the first relationship exists; and said step of employing the second signal includes the step of actuting the score means in response to the second signal when a relationship other than the first relationship exists.

6. The method as set forth in claim 1 wherein severing means is positioned along the movement path and the substrate is a glass ribbon which is monitored to actuate the severing means and further including:

said step of employing the first signal includes the step of actuating the severing means in response to the first signal when the first relationship exists; and said step of employing the second signal includes the step of actuating the severing means in response to the second signal when the relationship other than the first relationship exists.

7. The method as set forth in claim 5 or 6 wherein the first displacement signal is primary pulses, the second displacement signal is secondary pulses, said determining step is accomplished by accumulating the difference between the primary pulses and the secondary pulses for a given ribbon displacement, the first relationship exists when the accumulated difference is less than the predetermined value and the other relationship exists when the accumulated difference is more than the predetermined value.

8. A method of monitoring movement of a glass ribbon advancing on conveying means along a movement path through a scoring position having scoring means to actuate the scoring means, comprising the steps of:

generating a first signal as a function of advancement by the conveying means;

generating a second signal as a function of ribbon advance;

determining the difference between the first signal and second signal;

actuating the scoring means in response to the first signal when differences of said determining step have a first relationship to a predetermined standard; and actuating the scoring means in response to the second signal when differences of said determining step has a relationship other than the first relationship.

9. The method as set forth in claim 8 wherein the first signal is primary pulses, the second signal is secondary pulses and said determining step is accomplished by:

accumulating the difference between the primary pulses and the secondary pulses for a given ribbon displacement;

said step of actuating the scoring means in response to the primary pulses is practiced when the accumulated difference is less than the predetermined standard; and said step of actuating the scoring means in response to the secondary pulses is practiced when the accumulated difference is more than the predetermined standard.

10. A method of monitoring movement of a glass ribbon advancing on conveying means along a movement path through a severing station having severing means to actuate the severing means comprising the steps of:

generating a first signal as a function of advancement by the conveying means;

generating a second signal as a function of ribbon advance;

determining the differences between the first signal and second signal;

actuating the severing means in response to the first signal when differences of said determining step have a first relationship to a predetermined standard; and actuating the severing means in response to the second signal when differences of said determining step have a relationship other than the first relationship.

11. The method as set forth in claim 10 wherein the first signal is primary pulses, the second signal is secondary pulses and said determining step is accomplished by:

accumulating the difference between the primary pulses and the secondary pulses for a given ribbon displacement;

said step of actuating the severing means in response to the primary pulses is practiced when the accumulated difference is less than the predetermined standard; and said step of actuating the severing means in response to the secondary pulses is practiced when the accumulated difference is more than the predetermined standard.

12. The method as set forth in claim 9 or 11 further including the steps of:

comparing the count of the secondary pulses and the count of the primary pulses on a periodic schedule to determine ratio changes therebetween;

acting on the secondary pulses when a ratio change is detected such that the primary pulse count and the secondary pulse count are approximately equal when the substrate advance is monitored by the primary pulse count; and performing said acting step before practicing said step of determining the difference.

13. An apparatus for monitoring movement of a substrate advancing along a movement path through at least one work station to activate the at least one work station, comprising:

means for advancing the substrate along the path;

first signal generating means;

second signal generating means;

means for powering said advancing means and said first signal generating means for generating a first signal;

means engageable with the substrate and acting on said second generating means for generating a second signal;

means acting on the first signal and second signal for determining differences therebetween; and means acted on by the first signal when the differences have a first relationship to a predetermined standard for employing the first signal to monitor displacement of the substrate to activate the at least one work station and acted on by the second signal when the differences have a relationship other than the first relationship for employing the second signal to monitor displacement of the substrate to activate the at least one work station.

14. The apparatus as set forth in claim 13 wherein said first signal generating means includes:

a power supply;

at least one motor powered by said powering means; and generating means for generating primary pulses operatively connected to said powering means; and said second signal generating means includes:

a wheel rotatably mounted above the movement path;

means for biasing the wheel toward the conveyor; and second generating means for generating secondary pulses operatively connected to said wheel.

15. The apparatus as set forth in claim 14 wherein the substrate is a glass ribbon and the at least one work station is a scoring station having scoring means, further including:

means responsive to the primary pulses when employed and to the secondary pulses when employed for actuating said scoring means.

16. The apparatus as set forth in claim 14 wherein the substrate is a glass ribbon and the at least one work station is a severing station having severing means, further including:

means responsive to the primary pulses when employed and the secondary pulses when employed for activating said scoring means.

17. The apparatus as set forth in claim 13 wherein the substrate is a glass ribbon and the at least one work station is a scoring station having scoring means, wherein said employing means includes:

means responsive to the first signal when employed and the second signal when employed for actuating said scoring means to score the ribbon.

18. The apparatus as set forth in claim 13 wherein the substrate is a glass ribbon and the at least one work station is a severing station having severing means, wherein said employing means includes:

means responsive to the first signal when employed and the second signal when employed for acutating said severing means for severing the ribbon.

19. The apparatus as set forth in claim 17 or 18 further including:

means receiving a primary pulse count and secondary pulse count for determing the ratio therebetween; and means responsive to said determining means and acting on said secondary pulse for adjusting the secondary pulse counts when the ratio therebetween varies.

* * * * *